United States Patent [19]

Fujimoto et al.

[11] Patent Number: 4,582,691

[45] Date of Patent: Apr. 15, 1986

[54] PROCESS FOR SEPARATING FE(III) FROM AN AQUEOUS SOLUTION OF METALLIC SALTS AND A PROCESS FOR SEPARATING FE(III) FROM AN ORGANIC EXTRACTION SOLVENT

[75] Inventors: Akihiro Fujimoto, Osaka; Isami Miura, Nara; Tadanori Matsumura, Osaka, all of Japan

[73] Assignee: Daihachi Chemical Industry Co., Ltd., Osaka, Japan

[21] Appl. No.: 643,714

[22] Filed: Aug. 24, 1984

[30] Foreign Application Priority Data

Aug. 25, 1983 [JP] Japan .................... 58-156065

[51] Int. Cl.$^4$ ............................... B01D 11/00
[52] U.S. Cl. ........................ 423/139; 423/DIG. 14; 75/101 BE; 210/648; 210/673; 210/638; 210/681
[58] Field of Search ......... 423/139, 140, 24, DIG. 14; 75/101 BE; 210/648, 638, 673, 681

[56] References Cited

U.S. PATENT DOCUMENTS

| | | | |
|---|---|---|---|
| 3,966,569 | 6/1976 | Reinhardt et al. | 423/139 |
| 4,332,684 | 6/1982 | De Schepper et al. | 423/139 |
| 4,353,883 | 10/1982 | Rickelton et al. | 423/139 |
| 4,490,338 | 12/1984 | De Schepper et al. | 423/139 |

OTHER PUBLICATIONS

Dr. D. S. Fleet, *International Solvent Extraction Conf.* (1980).
Dr. D. S. Fleet, Het Ingenieurbald, 4 le jaargang (1972), pp. 424 to 432.

Primary Examiner—John Doll
Assistant Examiner—Robert L. Stoll
Attorney, Agent, or Firm—Spencer & Frank

[57] ABSTRACT

A process for separating Fe(III) from an aqueous solution of metallic salts containing at least Fe(III), comprising: (1) bringing said aqueous solution into contact with an organic extraction solvent containing, as an extractant, an organic phosphinic acid represented by the following general formula to thereby extract at least Fe(III) from the aqueous phase and transfer it into the organic phase;

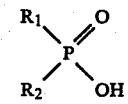

wherein $R_1$ and $R_2$ are alkyls, respectively, having carbon number in the range of 1 to 20; the sum of carbon numbers for $R_1$ and $R_2$ is in the range of 12 to 36; and $R_1$ is the same as or different from $R_2$, and (2) separating the resulting Fe(III) loaded organic phase from said aqueous phase.

A process for separating Fe(III) from an organic extraction solvent loaded with at least Fe(III), comprising: (1) bringing said extraction solvent into contact with an aqueous solution of a mineral acid having a low concentration at pH 1.1 or less to thereby strip Fe(III) from the organic phase and transfer it into the aqueous phase, said organic extraction solvent containing an organic phosphinic acid as an extractant represented by the following formula:

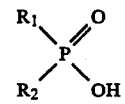

wherein $R_1$ and $R_2$ are alkyls, respectively, having a carbon number in the range of 1 to 20; the sum of the carbon numbers for $R_1$ and $R_2$ is in the range of 12 to 36; and $R_1$ is the same as or different from $R_2$, and (2) separating the resulting aqueous phase containing Fe(III) from said organic phase.

14 Claims, 5 Drawing Figures

PROCESS FOR SEPARATING FE(III) FROM AN AQUEOUS SOLUTION OF METALLIC SALTS AND A PROCESS FOR SEPARATING FE(III) FROM AN ORGANIC EXTRACTION SOLVENT

BACKGROUND OF THE INVENTION

1. Field of the Invention

This invention relates to a process for separating at least Fe(III) from an aqueous metallic salt solution containing at least Fe(III) using a certain organic extraction solvent, and a process for stripping Fe(III) from an organic extraction solvent loaded with Fe(III) using a mineral acid.

2. Description of the Prior Art

Aqueous solutions containing ferric ions are obtained from, for example, hydrometallurgy of ores, metal concentrates, etc.; using a mineral acid, resulting in acidic aqueous solutions containing ferric ions and other useful metal ions. Such aqueous solutions are also obtainable from the purification of metallic salts, industrial wastes, etc.

The recovery of useful metals from such acidic aqueous solutions is carried out by the addition of an alkali to the acidic aqueous solutions to thereby precipitate ferric ions as hydroxides. However, this conventional precipitation method requires the separation of hydroxides, which are difficult to filter, from the liquid phase. Also according to this conventional precipitation method, losses of the target metals due to the coprecipitation thereof with the hydroxides are not small. To eliminate these drawbacks, a solvent extraction method has been proposed wherein Fe(III) is extracted from an aqueous solution of metallic salts using an extraction solvent obtained by dissolving di-2-ethylhexyl phosphoric acid (D2EHPA) in kerosene. According to this method, however, in order to strip Fe(III) from the Fe(III) loaded extraction solvent, it is essential to bring the said extraction solvent in contact with 6N-hydrochloric acid. the use of 6N (or more)-sulfuric acid instead of 6N-hydrochloric acid results in insufficient stripping of Fe(III).

Similar solvent extraction methods have been also applied to the recovery or the purification of other metals from the remaining aqueous solution using an extraction solvent, D2EHPA. However, since iron of several milligrams per liter is still left in the remaining aqueous solution, which is also contaminated by iron from the corrosion of the extraction equipment, iron is increasingly accumulated in the extraction solvent so that it is unavoidably admixed into the other metals to be extracted when the extraction solvent is recycled to extraction processes.

Thus, it is desirable to extract Fe(III) prior to other metals and use an extractant with which a mineral acid, especially sulfuric acid, can be employed in a low concentration, so as to make stripping of Fe(III) more efficient.

SUMMARY OF THE INVENTION

The process of this invention which overcomes the above-discussed disadvantages and other numerous drawbacks and deficiencies of the prior art, is a process for separating Fe(III) from an aqueous solution of metallic salts containing at least Fe(III), comprising: (1) bringing said aqueous solution into contact with an organic extraction solvent containing, as an extractant, an organic phosphinic acid represented by the following general formula, to thereby extract at least Fe(III) from the aqueous phase and transferring it into the organic phase;

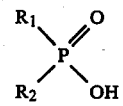

wherein $R_1$ and $R_2$ are alkyls, respectively, having a carbon number in the range of 1 to 20; the sum of the carbon numbers for $R_1$ and $R_2$ is in the range of 12 to 36; and $R_1$ is the same as or different from $R_2$, and (2) separating the resulting Fe(III) loaded organic phase from said aqueous phase.

At least one of said substituents $R_1$ and $R_2$ is, in a preferred embodiment, a branched alkyl.

The organic phosphinic acid is selected from the group consisting of bis-2-ethylhexyl phosphinic acid; di-isooctyl phosphinic acid; bis-3.5.5-trimethylhexyl phosphinic acid; di-isodecyl phosphinic acid; bis-2.4.4-trimethylpentyl phosphinic acid; bis-1-methylheptyl phosphinic acid; and, di-isostearyl phosphinic acid.

The process of this invention is also a process for separating Fe(III) from an organic extraction solvent loaded with at least Fe(III), comprising: (1) bringing said extraction solvent into contact with an aqueous solution of a mineral acid having a low concentration at pH 1.1 or less to thereby strip Fe(III) from the organic phase and transferring it into the aqueous phase, said organic extraction solvent containing an organic phosphinic acid as an extractant represented by the following formula:

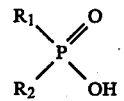

wherein $R_1$ and $R_2$ are alkyls, respectively, having a carbon number in the range of 1 to 20; the sum of the carbon numbers for $R_1$ and $R_2$ is in the range of 12 to 36; and $R_1$ is the same as or different from $R_2$, and (2) separating the resulting aqueous phase containing Fe(III) from said organic phase.

At least one of said substituents $R_1$ and $R_2$ is, in a preferred embodiment, a branched alkyl.

The mineral acid is, in a preferred embodiment, sulfuric, hydrochloric or nitric acid.

The aqueous phase is, in a preferred embodiment, in a concentration of $H^+$ ranging from 4N or less with respect to hydrochloric acid at pH 1.1 or less. The aqueous phase is also, in a preferred embodiment, in a concentration of $H^+$ ranging from 5N or less with respect to sulfuric acid at pH 1.1 or less. The stripping is, in a more preferred embodiment, carried out at a value of pH ranging from 0.0 to 1.1.

The phosphinic acid is selected from the group consisting of bis-2-ethylhexyl phosphinic acid; di-isooctyl phosphinic acid; bis-3.5.5-trimethylhexyl phosphinic acid; di-isodecyl phosphinic acid; bis-2.4.4-trimethylpentyl phosphinic acid; bis-1-methylheptyl phosphinic acid; and, di-isostearyl phosphinic acid.

Thus, the invention described herein makes possible the objects of (1) providing a process for readily and effectively separating at least Fe(III) from an aqueous metallic salt solution containing at least Fe(III) using an organic extraction solvent containing an organic phosphinic acid as an extractant; and (2) providing a process for readily and effectively stripping Fe(III) from the said organic extraction solvent loaded with at least Fe(III) using a mineral acid under a mild condition.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
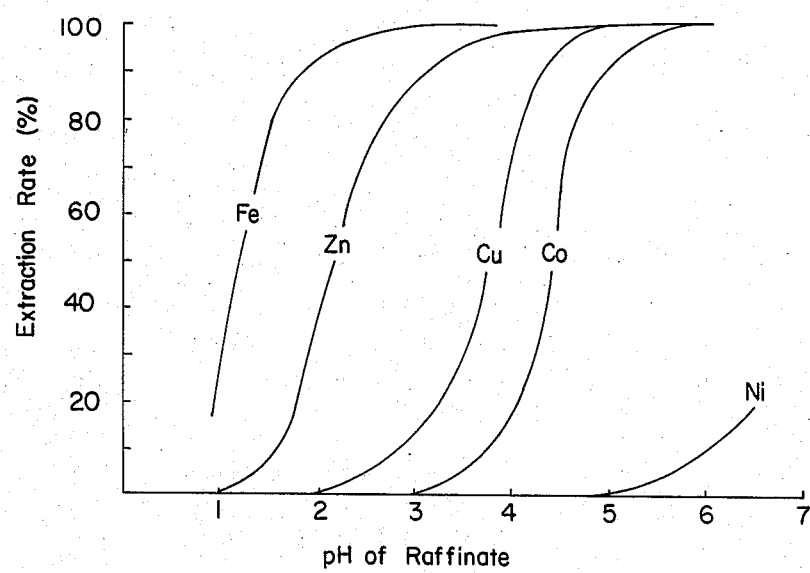
FIG. 1 is a graph showing the relationship between the pH of raffinate and the extraction rates of each metal extracted from the aqueous solution.

The organic extraction solvent used in the present invention contains, as an extractant, an organic phosphinic acid represented by the following general formula:

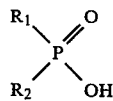

wherein $R_1$ and $R_2$ are alkyls, respectively, having a carbon number in the range of 1 to 20; the sum of the carbon numbers for $R_1$ and $R_2$ is in the range of 12 to 36; and $R_1$ is the same as or different from $R_2$.

At least one of $R_1$ and $R_2$ is a branched alkyl thereby attaining the excellent solvent-solubility of the extractant. When the sum of the carbon numbers for $R_1$ and $R_2$ is less than 12, the water-solubility of the extractant becomes great causing loss of the extractant, while when it is beyond 36, the maximum Fe(III)-loading capacity of the extraction solvent becomes less. Typical examples of the organic phosphinic acid is bis-2-ethylhexyl phosphinic acid; di-isooctyl phosphinic acid; bis-3.5.5-trimethylhexyl phosphinic acid; di-isodecyl phosphinic acid; bis-2.4.4-trimethylpentyl phosphinic acid; bis-1-methylheptyl phosphinic acid; and, di-isostearyl phosphinic acid.

The extractant mentioned above is a cationexchange type-acidic extractant which achieves an extraction reaction by ion exchange reaction between the acidic groups of the extractant and the cations of metals to be extracted. Thus, both the extraction and the stripping in this invention are related to the pH buffer action. The order of metals to be extracted is, for example, Fe(III), Zn(II), Cu(II), Co(II) and Ni(II). Each of these metals is, in turn, extracted in this order at a high extraction pH value at which the organic phase and the aqueous phase come into contact with each other, while Fe(III) is finally stripped at a low stripping pH value at which both phases come into contact with each other.

The fundamental operations of the solvent extractant method according to this invention are as follows:

(1) The Extraction Process: At least Fe(III) is extracted from an aqueous solution containing at least Fe(III) and transferred it into an organic extraction solvent containing the above-mentioned organic phosphinic acid by subjecting the said aqueous solution and the organic extraction solvent to an liquid-liquid contact, wherein the extraction pH is adjusted using a mineral acid or an alkali if desired. Thereafter, the resulting Fe(III) loaded organic phase is separated from the aqueous phase.

(2) The Stripping Process: Fe(III) is stripped from the organic phase containing Fe(III) into the aqueous phase containing a mineral acid by subjecting both phases to a liquid-liquid contact, and then the organic phase is separated from the aqueous phase which is subsequently recycled to the extraction process.

An organic solvent is employed in this invention for dilution and dissolution of the extractant, which is dissolved in the range of 1 to 70% by volume, preferably 5 to 40% by volume. The organic solvent should be able to dissolve the extraction to form an organic phase and a water phase at rest after the liquid-liquid contact from the metal-containing water phase into the solvent phase. It should also be insoluble in water, and should not inhibit the function of the extractant in the extraction of metals from the metal-containing aqueous solution. Effective solvents are paraffin hydrocarbon, naphthene hydrocarbon, aromatic hydrocarbon, etc., having a high flash point, examples of which are distillates of petroleum such as kerosene and naphtha.

In the separation of the aqueous phase and the organic phase at rest, the separation of the two phases will be incomplete if emulsion occurs. According to the inventors' experimental results, in such a case, the addition of an emulsion inhibitor, such as a neutral phosphrous compound or a greater amount of alcohol to the organic solvent, was found to be able to prevent the formation of emulsion without inhibiting the function of the extraction. Such an emulsion inhibitor is, for example, tributyl phosphate or isodecanol, which is added to the extractant in a concentration of 25% by weight or less. When it is beyond 25% by weight, the ability of the extraction solvent to selectively extract each of desired metals is reduced.

The extraction pH is adjusted to be in the range of 1 to 7 in a countercurrent extraction with multiple steps. The extraction pH is preferably adjusted to 2.0 or higher in order to reduce the residual Fe(III) in the water phase of the raffinate thereby increasing the amount of Fe(III) recovered. The optimum pH value is dependent upon the purpose of the extraction; for example, in the case that Cu(II) is intended to be separated from Co(II) with regard to an aqueous solution containing Fe(III), Cu(II) and Co(II), the pH value should be selected in such a manner that Cu(II) can be sufficiently extracted, while as much of the Fe(III) and Co(II) will remain in the aqueous solution when the concentration of Fe(III) is small. When the concentration of Fe(III) in the aqueous solution is high, however, the pH value should be selected in such a manner that as much Fe(III) can be extracted as possible without the extraction of Cu(II).

Control of the pH is conducted by converting a suitable portion of the acidic groups of the extractant in the organic solvent into alkali salts. The value of the pH may also be controlled by adding an alkali or a mineral acid to the organic phase or the aqueous phase. Effective alkali salts are hydroxides or carbonates which contain alkali ions such as ammonium ions, alkali metal ions and metal ions (to be extracted later than the target metals). As alkali salts, ammonia, sodium hydroxide, sodium carbonate, etc., which are in general use in an aqueous solution, are suitable.

The temperature at which the liquid-liquid contact and the phase separation are carried out is not essential although it is preferably high in light of the acceleration of both the viscosity-drop and the phase separation rate. However, the temperature is preferably maintained in the range of 10° to 80° C. in consideration of the flash point of the organic solvent and the necessity of heating energy for the organic solvent.

The procedure of extraction by the contact of the organic solvent and the starting aqueous solution used in this invention may be anyone of those well-known in extraction using solvents. That is, although continuous extraction with multiple stages is generally preferred, batch, continuous batch, and batch circulation processes are also effective. Packed column, pulse column etc., rotating disc column processes etc., are preferably used in countercurrent extraction with multiple stages, but any well-known contact equipment generally used for solvent extraction is applicable for this invention.

The ratio of volume of the organic phase to the aqueous phase may be varied over a considerable range. The effective ratio is in the range of 1/20 to 20/1. The most effective ratio is dependent on the concentration of the extractant, and the concentration of the metals in the aqueous solution to be extracted, and on the method of mixing those liquids and the type of the equipment used.

Although metals in the aqueous solution can be extracted by the solvent at the gram equivalent weight corresponding to the concentration of extractant in the solvent, the volume ratio of the organic phase to the aqueous phase is generally controlled to maintain the metal concentration below that level, preferably in the range of 50 to 90% of that level.

The organic phase which contains Fe(III) due to extraction and/or scrubbing is subjected to a stripping process, in which it is brought into contact with an aqueous solution containing an inorganic acid to eliminate and recover the Fe(III) using liquid-liquid contact equipment of well-known design (e.g., a mixer-settler in one or several stages) in the same manner as in the extraction process.

The volume ratio of the organic phase to the inorganic acid solution is related to the concentration of Fe(III) in the organic phase and the concentration of the inorganic acid, and is generally selected to be in the range of 20/1 to 1/10.

The inorganic acid is, for example, sulfuric, hydrochloric or nitric acid, and the choice is dependent on the kind of Fe(III) salt desired. The inorganic acid may include iron ions. The concentration of inorganic acid in contact with the organic phase is in the range of 0.25 to 5N, but the value of pH at which the organic phase and the inorganic acid are in contact with each other is most important. The pH value, which is determined by an ion exchange between Fe(III) in the organic phase and a proton of the inorganic acid, is generally 1.1 or less, preferably 0.5 or less thereby allowing Fe(III) to be effectively stripped. The pH value may be zero or less by the use of a concentrated inorganic acid. Since stripping can be easily carried out according to this invention, the concentration of inorganic acid in the aqueous phase is not required to be over 5N when in contact with the organic phase. Moreover, when the concentration of inorganic acid (e.g., hydrochloric or nitric acid) is high, the extractant and the Fe(III) salt form a solvation, resulting in re-extraction of Fe(III) from the aqueous phase into the organic phase. Therefore, when hydrochloric or nitric acid is employed as an inorganic acid, the acid concentration of the aqueous phase should be 4N or less when in contact with the organic phase.

The temperature in stripping is in the range of 10° to 80° C. determined by the same considerations as in the extraction process, but it is not limited thereto. Where sulfuric acid is employed as an inorganic acid in the stripping process, the temperature is preferably 40° C. or higher because a higher temperature is better in order to increase the stripping rate and decrease the time of contact of the organic phase with the aqueous phase. When hydrochloric or nitric acid is employed, a significantly high stripping rate can be attained without such a high temperature. Thus, when the kind of inorganic acid is not limited in the stripping process, the use of hydrochloric or nitric acid is advantageous over that of sulfuric acid in that smaller equipment can be employed and energy consumed in operation can be reduced.

The organic phase regenerated by the stripping treatment is then circulated to the extraction process. For the separation of Fe(III) by first removing other metals such as Zn(II), Cu(II), Co(II) and Ni(II) which are extracted from the aqueous phase and transferred into the organic phase, the arrangement of a scrubbing process between the extraction process and the stripping process is also effective. When the content of the said metals, other than Fe(III), in the organic phase to be treated in the scrubbing process is greater than that of Fe(III), this scrubbing process is regarded as a stripping process with respect to the said metals.

The organic phase is scrubbed by an aqueous solution containing an inorganic acid, etc. in the solvent extraction equipment of a well-known design using the aforementioned liquid-liquid extraction procedures. Metal salts remaining in the aqueous phase after the scrubbing are recovered by feeding them back into the extraction process. The volume ratio (O/A) of the organic phase to the aqueous phase is varied over a considerable range, but it is selected in the range of 0.5 to 5 in practice. The value of pH in the scrubbing process should be a value at which the target metals are allowed to pass from the organic phase into the aqueous phase, while Fe(III) is prevented from passing from the organic phase into the aqueous phase. Thus, the optimum value of pH is in the range of 1.1 to 5.5. The temperature in the scrubbing process is in the range of 10° to 80° C. which is the same as that in the extraction and stripping processes. The scrubbing process may be composed of two or more stages to improve the purity of each of the metals such as Zn(II), Cu(II), Co(II), Ni(II), etc. to be scrubbed.

Fe(III) in the phrase "Fe(III) loaded extraction solvent" described herein involves iron derived from, not only the aqueous solution, but also corrosion of the equipment.

Although the following examples describe an aqueous solution containing Zn(II), Cu(II), Co(II), Ni(II), etc. as metals other than Fe(III), an aqueous solution containing other metals such as Fe(II), Mn(II), Mg(II), In(III), Al(III), rare earth metals (III) in addition to Fe(III) is, of course, applicable to this invention.

EXAMPLE 1

This experiment was carried out in order to demonstrate the separation ability of the extractant, in this invention with regard to Fe(III), Zn(II), Cu(II), Co(II) and Ni(II).

As an extractant, bis-2-ethylhexyl phosphinic acid (BEHPNA) was dissolved in kerosene (an aliphatic hydrocarbon diluent) to a concentration of 20% by volume (0.6 mol/l), resulting in an extraction solvent which was then converted into an ammonium salt by the addition of ammonia water of a given concentration. This solvent was brought into contact with an aqueous solution containing sulfuric salt of Fe(III), Zn(II), Cu(II), Co(II) and Ni(II). The contact was carried out by shaking the mixture for 1 hour in an Erlenmeyer flask immersed in a water bath at 25° C. The ratio (O/A) of the volume of the organic phase to that of the aqueous phase was 1:1. The initial concentration of each of Fe(III), Zn(II), Cu(II), Co(II) and Ni(II) in the aqueous solution was 1.0 g/l, 0.79 g/l, 0.51 g/l, 4.8 g/l and 14.4 g/l, respectively. The relation between the pH at extraction, where there is buffering due to the variation of the ratio of ammonium salts in the extractant, and the extraction rate of each metal from the aqueous solution into the organic phase is shown in FIG. 1.

FIG. 1 indicates that when bis-2-ethylhexyl phosphinic acid was used as an extractant, Fe(III), Zn(II), Cu(II), Co(II) and Ni(II) are in turn extracted with an increase in the value of the pH at extraction and that the selection of the pH value at extraction allows for the separation of these metals from each other. FIG. 1 also indicates that the pH value at extraction should be adjusted to approximately over 1.0, preferably over 2.0 in order to extract Fe(III) from the aqueous solution.

EXAMPLE 2

This experiment was carried out to demonstrate the Fe(III) stripping ability of the extractant in this invention from the organic phase to the aqueous phase.

A kerosene solution containing bis-2-ethylhexyl phosphinic acid (BEHPNA) at a concentration of 10% by volume was employed as an extraction solvent, which was brought into contact with an aqueous solution containing ferric sulfate resulting in an organic phase loaded with Fe(III) having a concentration of 3.9 g/l. The organic phase was then brought into contact with sulfuric or hydrochloric acid at equal volume in order to determine the relation between the concentration of mineral acids and the stripping rate of Fe(III). The contact was carried out by shaking the mixture for 1 hour at 25° C. For a comparison therewith, an extraction solvent containing the conventional extractant di-2-ethylhexyl phosphoric acid (D2EHPA) at a concentration of 0.3 mol/l was loaded with Fe(III) in a concentration of 3.9 g/l and then subjected to the same stripping process as the above-mentioned.

Figure 2A:
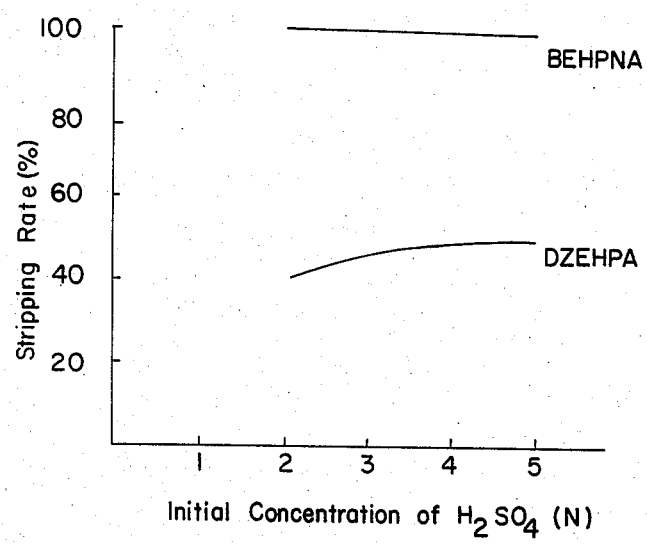
FIGS. 2(a) and 2(b), respectively, are graphs showing the relationship between the concentration of sulfuric acid and the stripping rates and the relationship between the concentration of hydrochloric acid and the stripping rate with regard to BEHPNA and D2EHPA.

FIG. 2(a) is a graph showing the relationship between the concentration of sulfuric acid and the stripping rate. It is clear therefrom that 100% of Fe(III) is stripped from the organic phase with the extractant BEHPNA in this invention using sulfuric acid having a concentration of 2 to 5N, while only half or less the amount of Fe(III) is stripped from the organic phase with the conventional extractant D2EHPA, even using sulfuric acid having a concentration of as high as 5N.

Figure 2B:
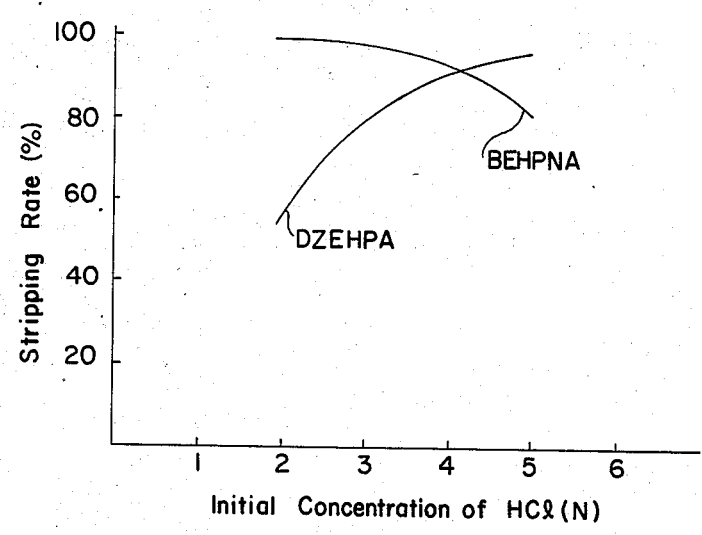

FIG. 2(b) is a graph showing the relationship between the concentration of hydrochloric acid and the stripping rate. It is clear therefrom that the maximum rate of stripping is attained with hydrochloric acid having a concentration of approximately 2N with respect to the extractant BEHPNA in this invention, while the rate of stripping by the use of BEHPNA becomes lower than that by the use of D2EHPA as the concentration of hydrochloric acid is beyond 4N. Thus, it can be seen that, using the extractant BEHPNA in this invention, Fe(III) is effectively stripped from the organic phase into the aqueous phase with a mineral acid having a low concentration of 2N or less.

EXAMPLE 3

This experiment was carried out to demonstrate the Fe(III) stripping ability of the extractant in this invention using a mineral acid with a low concentration.

Figure 3:
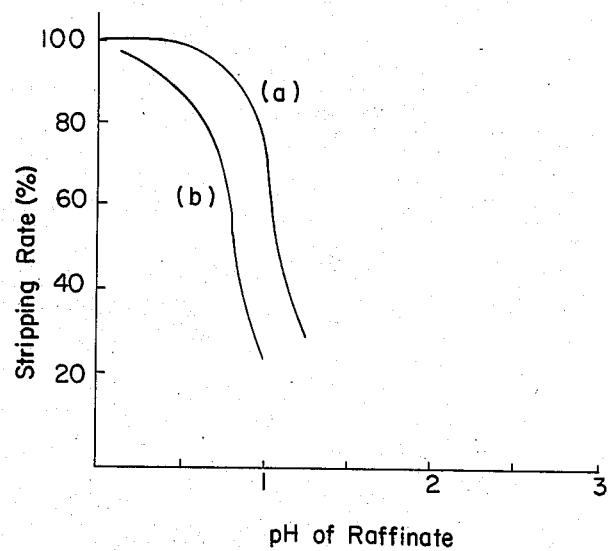
FIG. 3 is a graph showing the relationship between the pH of raffinate, after the Fe(III) loaded extraction solvent is brought into contact with an aqueous hydrochloric acid solution, and the stripping rate of Fe(III).

A kerosene solution containing BEHPNA in a concentration of 10% by volume was used as an extraction solvent, which was then treated in the same manner as in Example 2 to prepare an organic phase which was loaded with Fe(III) in a concentration of 3.9 g/l. The organic phase was then brought into contact with an acidic aqueous solution containing sulfuric or hydrochloric acid in a low concentration of 1N or less. The contact was carried out by shaking the mixture for 2 hours at 25° C. The ratio (O/A) of the volume of the organic phase to that of the aqueous phase was 1:1. FIG. 3 is a graph showing the relationship between the pH of the aqueous phase after the contact and the rate of the Fe(III) stripping, wherein curves (a) and (b) are the strippings processes using sulfuric and hydrochloric acids, respectively. It is seen therefrom that Fe(III) can be stripped from the organic phase into the aqueous phase at a pH in a measurable range with respect to the hydrogen-ion concentration in the aqueous phase. It is also seen therefrom that the pH value at which both phases are in contact is 1.1 or less, preferably 0.9 or less when sulfuric acid is used as a mineral acid, while it is 0.8 or less, preferably 0.5 or less, when hydrochloric acid is used as a mineral acid.

EXAMPLE 4

This experiment was carried out to demonstrate the effects of the concentration of extractant and an amount of loaded Fe(III) in the extraction solvent on stripping.

Figure 4:
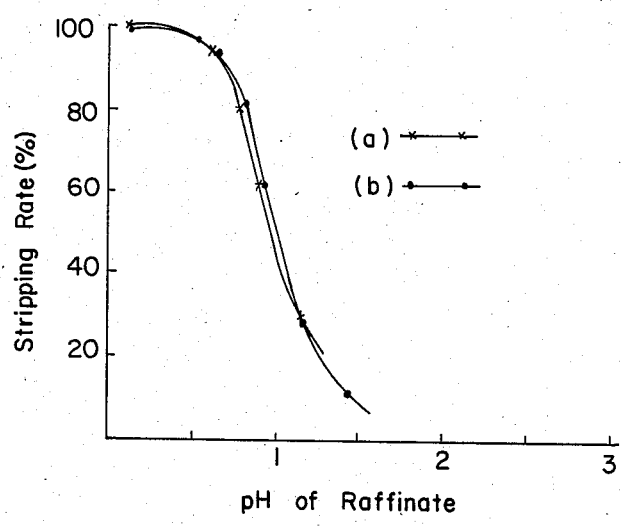
FIG. 4 is a graph showing the relationship between the pH of raffinate, at the time when thhe Fe(III) loaded extraction solvent is brought into contact with an aqueous hydrochloric acid solution, and the stripping rate of Fe(III).

A kerosene solution containing BEHPNA in a concentration of 20% by volume was used as an extraction solvent, which was treated to prepare an organic phase which was loaded with Fe(III) in a concentration of 7.701 g/l. The organic phase was brought into contact with an aqueous solution of sulfuric acid having various concentrations in the same manner as in Example 3 to determine the relationship between the pH of the aqueous phase, at which both phases are in contact, and the rate of the Fe(III) stripping. The results are shown in Table 1 and FIG. 4, particularly, curve (a).

TABLE 1

| Conc. (N) of $H_2SO_4$ | pH of the aqueous phase in contact with the organic phase | Fe(III) conc. (g/l) in the organic phase | Stripping rate (%) |
|---|---|---|---|
| 0.250 | 1.18 | 5.510 | 28 |
| 0.515 | 0.90 | 2.730 | 65 |

TABLE 1-continued

| Conc. (N) of $H_2SO_4$ | pH of the aqueous phase in contact with the organic phase | Fe(III) conc. (g/l) in the organic phase | Stripping rate (%) |
|---|---|---|---|
| 1.000 | 0.58 | 0.352 | 95.4 |
| 2.05 | 0.17 | 0.036 | 99.5 |
| 4.05 | −0.2 | 0.009 | 99.9 |

EXAMPLE 5

This experiment was carried out to demonstrate the effects of the amount of loaded Fe(III) in the extraction solvent.

The stripping conditions are the same as in Example 4 except that an organic phase which consists of a kerosene solution containing BEHPNA in a concentration of 20% by volume and Fe(III) in a concentration of 0.920 g/l. The results are shown in Table 2 and FIG. 4, particulary, curve (b), indicating that, due to the use of a double concentration of the extractant in the extraction solvent, the stripping curves in FIG. 4 were shifted to the lower pH regions to the extent of approximately 0.1 as compared with the spripping curves in FIG. 3 with respect to Example 3, and that Fe(III) can be sufficiently stripped from the organic phase into the aqueous phase at a pH of 0.0 or higher.

TABLE 2

| Conc. (N) of $H_2SO_4$ | Conc. (N) of $H_2SO_4$ in the aqueous phase in contact with the organic phase | pH of the aqueous phase in contact with the organic phase | Fe(III) conc. (g/l) in the organic phase | Stripping rate (%) |
|---|---|---|---|---|
| 0.10 | 0.1 | 1.43 | 0.814 | 11.9 |
| 0.50 | 0.5 | 0.80 | 0.137 | 85.1 |
| 1.00 | 1.0 | 0.50 | 0.023 | 97.5 |
| 2.05 | 2.0 | 0.19 | 0.007 | 99.2 |

EXAMPLE 6

Stripping was carried out using aqueous acidic solutions containing Fe(III) in various concentrations.

An organic phase was prepared by loading a kerosene solution containing BEHPNA in a concentration of 20% by volume with Fe(III) in a concentration of 1.0 g/l, and then brought into contact with an aqueous acidic solution containing Fe(III) in a concentration of 10 g/l or 100 g/l at the ratio of 1:1 of the volume of the organic phase to that of the aqueous phase. The other stripping conditions were the same as in Example 3. An aqueous acidic solution containing Fe(III) was prepared by dissolving Fe(III) salt of the corresponding mineral acid in an aqueous solution of said mineral acid. The results are shown in Table 3, indicating that Fe(III) can be effectively stripped from the organic phase, remaining a concentration of as low as 1 g/l or less in the organic phase when an aqueous solution of sulfuric acid containing Fe(III) is in a concentration of 100 g/l or hydrochloric acid containing Fe(III) of 10 g/l was employed as an aqueous acidic solution.

Another stripping experiment indicated that Fe(III) was removed to the extent of 1.4 g/l from an organic phase containing Fe(III) in a concentration of 7.7 g/l by a stripping treatment of the organic phase with a hydrochloric acid solution containing Fe(III) in a concentration of 100 g/l.

TABLE 3

| Aqueous solution of mineral acid containing Fe(III) | | | pH of the aqueous phase in contact with the organic phase | Conc. (g/l) of Fe(III) remaining in the organic phase | Stripping rate (%) |
|---|---|---|---|---|---|
| Kind of mineral acid | Fe(III) conc. (g/l) | Mineral acid conc. (N) | | | |
| $H_2SO_4$ | 10 | 1.92 | 0.10 | 0.028 | 97 |
| $H_2SO_4$ | 100 | 0.97 | −0.3 | 0.28 | 72 |
| HCl | 10 | 2.03 | −0.25 | 0.33 | 67 |

EXAMPLE 7

The separation of Fe(III) from a starting aqueous solution containing Fe(III), Cu(II), Co(II) and Ni(II) was carried out by a series of treatments of extraction, scrubbing and stripping.

(a) The Extraction Process: Two hundred milliliters of a starting aqueous solution of sulfuric acid containing Fe(III) in a concentration of 1.02 g/l, Cu(II) in a concentration of 1.98 g/l, Co(II) in a concentration of 4.81 g/l, and Ni(II) in a concentration of 15.0 g/l was brought into contact with 200 ml of a kerosene solution containing BEHPNA in a concentration of 20% by volume to extract Fe(III), Cu(II) and Co(II) from the aqueous solution. The pH at which both liquids were in contact was adjusted to 6.0 by the addition of 5.4 ml of concentrated ammonia water to the extraction solvent. The contact was carried out by shaking the mixture for 1 hour at 25° C., resulting in 202 ml of an organic phase containing Fe(III) in a concentration of 1.02 g/l, Cu(II) in a concentration of 2.01 g/l, Co(II) in a concentration of 4.92 g/l and Ni(II) in a concentration of 0.98 g/l and 203 ml of an aqueous phase containing Fe(III) in a concentration of 0.000 g/l, Cu(II) in a concentration of 0.001 g/l, Co(II) in a concentration of 0.005 g/l and Ni(II) in a concentration of 14.0 g/l. This indicates that the approximate total amount of Fe(III), Cu(II) and Co(II) and about 6% of the amount of Ni(II) were extracted from the original aqueous solution, and Fe(III), Cu(II) and Co(II), except Ni(II), were removed from the aqueous solution.

(b) The Scrubbing Process: A scrubbing test was conducted to recover the metals other than Fe(III) from the organic phase obtained from the above-mentioned extraction process, wherein the organic phase was brought into contact with an aqueous solution of sulfuric acid at equal volume while shaking the mixture for 10 minutes at 25° C. The concentrations of sulfuric acid are shown in Table 4 along with the results of the scrubbing test. Table 4 indicates that the approximate total amount of each of the Cu, Co and Ni passed over into the aqueous phase at pH 2.0, while 99% of the amount of Fe(III) remained in the organic phase.

TABLE 4

| Test No. | Initial conc. (N) of $H_2SO_4$ | pH at which both phases are in contact | Fe conc. (g/l) Organic phase | Fe conc. (g/l) Aqueous phase | Cu conc. (g/l) Organic phase | Cu conc. (g/l) Aqueous phase | Co conc. (g/l) Organic phase | Co conc. (g/l) Aqueous phase | Ni conc. (g/l) Organic phase | Ni conc. (g/l) Aqueous phase |
|---|---|---|---|---|---|---|---|---|---|---|
| 1 | 0.26 | 3.2 | 1.02 | 0.000 | 0.274 | 1.74 | 0.092 | 4.77 | 0.003 | 0.98 |
| 2 | 0.28 | 2.5 | 1.01 | 0.003 | 0.014 | 2.00 | 0.004 | 4.89 | 0.001 | 0.98 |
| 3 | 0.30 | 2.0 | 1.00 | 0.007 | 0.002 | 2.02 | 0.001 | 4.92 | 0.000 | 0.98 |

(c) The Stripping Process: A stripping test was conducted to remove Fe(III) from the organic phase containing Fe(III) in a concentration of 1.00 g/l which was obtained from the above-mentioned scrubbing process, Test No. 3. The organic phase was brought into contact with an aqueous solution of sulfuric acid at equal volume while shaking the mixture for 1 hour at 60° C. The concentrations of sulfuric acid are shown in Table 5 along with the results of the stripping test. It is seen therefrom that sufficient stripping of Fe(III) was performed in each of tests No. 2, No. 3 and No. 4, resulting in a re-usable organic phase.

TABLE 5

| Test No. | Initial conc. (N) of $H_2SO_4$ | pH at which both phases are in contact | Conc. (N) of $H_2SO_4$ in the aqueous phase after stripping | Fe(III) conc. (g/l) in the organic phase | Fe(III) conc. (g/l) in aqueous phase | Stripping rate (%) |
|---|---|---|---|---|---|---|
| 1 | 0.100 | 1.3 | 0.093 | 0.853 | 0.144 | 14.4 |
| 2 | 0.500 | 0.70 | 0.46 | 0.088 | 0.906 | 91 |
| 3 | 1.00 | 0.45 | 0.95 | 0.021 | 0.979 | 98 |
| 4 | 2.05 | 0.13 | 2.00 | 0.006 | 0.986 | 99 |

EXAMPLE 8

An extraction test was performed under the same conditions as in Example 1 except that a kerosene solution containing di-isodecyl phosphinic acid as an extractant in a concentration of 20% by volume was used as an extraction solvent. As a result, each of the extraction curves with respect to Fe(III), Zn(II), Cu(II), Co(II) and Ni(II) in not shown the graphs, with respect to the relationship between the pH at extraction and the rate of the extraction of each metal, exhibited the same pattern as in FIG. 1 in Example 1.

EXAMPLE 9

A stripping test was conducted under the same conditions as in Example 3 except that a kerosene solution containing di-isooctyl phosphinic acid as an extractant in a concentration of 10% by volume was used as an extraction solvent, which was then loaded with Fe(III) in a concentration of 3.9 g/l resulting in an organic phase which was subsequently brought into contact with an aqueous solution of sulfuric acid. It was seen therefrom that sufficient stripping of Fe(III) could be performed at a pH in a measurable range with respect to hydrogenproten concentration.

This invention, therefore, provides a simple process by which ferric ions are extracted and eliminated from the starting aqueous solution, using a solvent-solvent extraction technique, without a separation of solid from liquid as required in the conventional precipitation-by-neutralization method, thereby enabling effective continuous separation.

Also, according to this invention, stripping can be carried out using sulfuric acid in a low concentration, while sufficient stripping of Fe(III) cannot be attained even if sulfuric acid in high concentration is used so long as a conventional extractant such as D2EHPA is employed. Thus, not only can stripping be performed at a low cost, but the quality of materials used for stripping equipment can be reduced resulting in a reduction of the cost of the equipment. This invention also allows the significant decrease in the amount of hydrochloric acid used in stripping process as compared with stripping by the use of the conventional extractant D2EHPA, thereby reducing the stripping cost, as well.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A process for separating Fe(III) from an organic extraction solvent loaded with at least Fe(III), comprising:

(1) contacting said extraction solvent with an aqueous solution of an inorganic acid having a concentration of $H^+$ ranging from 5N or less at pH 1.1 or less to thereby strip Fe(III) from the organic phase and transfer it into the aqueous phase, said organic extraction solvent containing an organic phosphinic acid as an extractant represented by the following formula:

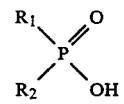

wherein $R_1$ and $R_2$ are alkyls, respectively, having a carbon number in the range of 1 to 20; the sum of the carbon number for $R_1$ and $R_2$ is in the range of 12 to 36; and $R_1$ is the same as or different from $R_2$, and (2) separating the resulting aqueous phase containing Fe(III) from said organic phase.

2. A process according to claim 1, wherein at least one of said substituents $R_1$ and $R_2$ is a branched alkyl.

3. A process according to claim 1, wherein said inorganic acid is sulfuric, hydrochloric or nitric acid.

4. A process according to claim 1, wherein said aqueous phase is in a concentration of H+ ranging from 4N or less with respect to hydrochloric acid at pH 1.1 or less.

5. A process according to claim 1, wherein said aqueous phase is in a concentration of H+ ranging from 5N or less with respect to sulfuric acid at pH 1.1 or less.

6. A process according to claim 1, wherein said stripping is carried out at a pH value of ranging from 0.0 to 1.1.

7. A process according to claim 1, wherein said organic phosphinic acid is selected from the group consisting of bis-2-ethylhexyl phosphinic acid; diisooctyl phosphinic acid; bis-3.5.5-trimethylhexyl phosphinic acid; di-isodecyl phosphinic acid; bis-2.4.4-trimethylpentyl phosphininc acid; bis-1-methylheptyl phosphinic acid; and, di-isostearyl phosphinic acid.

8. A process according to claim 1, wherein said extraction solvent is prepared by a process for separating Fe(III) from an aqueous solution of metallic salts containing at least Fe(III) comprising:

(1) bringing said aqueous solution into contact with an organic extraction solvent containing, as an extractant, an organic phosphinic acid represented by the following general formula to hereby extract at least Fe(III) from the aqueous phase and transfer it into the organic phase:

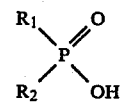

wherein $R_1$ and $R_2$ are alkyls, respectively, having a carbon number in the range of 1 to 20; the sum of the carbon number for $R_1$ and $R_2$ is in the range of 12 to 36; and $R_1$ is the same as or different from $R_2$, and (2) separating the resulting Fe(III) loaded organic phase from said aqueous phase.

9. A process according to claim 8, wherein at least one of said substituents $R_1$ and $R_2$ is a branched alkyl.

10. A process according to claim 8, wherein said inorganic acid is sulfuric, hydrochloric or nitric acid.

11. A process according to claim 8, wherein said aqueous phase is in a concentration of H+ ranging from 4N or less with respect to hydrochloric acid at a pH of 1.1 or less.

12. A process according to claim 8, wherein said aqueous phase is in a concentration of H+ ranging from 5N or less with respect to sulfuric acid at a pH of 1.1 or less.

13. A process according to claim 8, wherein said stripping is carried out at a pH value ranging from 0.0 to 1.1.

14. A process according to claim 8, wherein said organic phosphinic acid is selected from the group consisting of bis-2-ethylhexyl phosphinic acid; diisooctyl phosphonic acid; bis-3.5.5.-trimethylhexyl phosphinic acid; di-isodecyl phosphinic acid; bis-2.4.4-trimethylpentyl phosphinic acid; bis-1-methylheptyl phosphinic acid; and, di-isostearyl phosphinic acid.

* * * * *